US008243727B2

(12) United States Patent
Closset et al.

(10) Patent No.: US 8,243,727 B2
(45) Date of Patent: Aug. 14, 2012

(54) METHODS FOR SYNCHRONIZING APPLICATIVE CLOCK SIGNALS IN A SYNCHRONOUS COMMUNICATIONS NETWORK, CORRESPONDING EMITTER AND RECEIVER DEVICES, COMPUTER-READABLE STORAGE MEANS

(75) Inventors: Arnaud Closset, Cesson Sevigne (FR); Emmanuel Raguet, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 12/351,278

(22) Filed: Jan. 9, 2009

(65) Prior Publication Data

US 2009/0193284 A1    Jul. 30, 2009

(30) Foreign Application Priority Data

Jan. 24, 2008   (FR) ..................................... 08 50441

(51) Int. Cl.
    *H04L 12/16*   (2006.01)
(52) U.S. Cl. ........................................................ 370/362
(58) Field of Classification Search .................. None
    See application file for complete search history.

(56) References Cited

U.S. PATENT DOCUMENTS

| | | | | |
|---|---|---|---|---|
| 5,528,596 A | * | 6/1996 | Fisher et al. | 370/347 |
| 5,644,567 A | * | 7/1997 | Ikeda | 370/225 |
| 6,128,318 A | * | 10/2000 | Sato | 370/503 |
| 6,327,273 B1 | * | 12/2001 | Van der Putten et al. | 370/503 |
| 6,791,987 B1 | | 9/2004 | Eng et al. | 370/395.62 |
| 7,012,980 B2 | * | 3/2006 | Franke et al. | 375/356 |
| 7,106,713 B2 | * | 9/2006 | Pankaj | 370/336 |

(Continued)

FOREIGN PATENT DOCUMENTS

EP    1 054 793    11/2000

(Continued)

OTHER PUBLICATIONS

"Understanding Jitter and Wander Measurements and Standards", Agilent Technologies, 5899-6254EN, 2003, 141 pages.

(Continued)

*Primary Examiner* — Ayaz Sheikh
*Assistant Examiner* — Faiyazkhan Ghafoerkhan
(74) *Attorney, Agent, or Firm* — Fitzpatrick, Cella, Harper & Scinto

(57) ABSTRACT

A method for transmitting information is proposed, enabling a synchronization of applicative clocks signals between a transmission device and at least one reception device connected to a communications network. For each stream of a source application, the transmission device: writes to a buffer memory associated with the stream, at the rate of a source applicative clock, pieces of applicative data of the stream coming from the source application, transmits, via the network, pieces of applicative data of the stream at the rate of the network clock. For at least one stream of the source application, the transmission device performs the following steps upon detection of a clock adjustment event: determining a piece of time offset information between a starting instant of a current network cycle and an instant of writing one of the pieces of applicative data of the stream, called a reference piece of data, to the buffer memory associated with the stream; determining a piece of information on position of the reference piece of data from among the pieces of applicative data of this stream to be transmitted via the network during a determined network cycle; transmission on the communications network of the information on time offset and position during the same network cycle as the one in which the reference piece of data is transmitted.

14 Claims, 5 Drawing Sheets

U.S. PATENT DOCUMENTS

Figure 1:
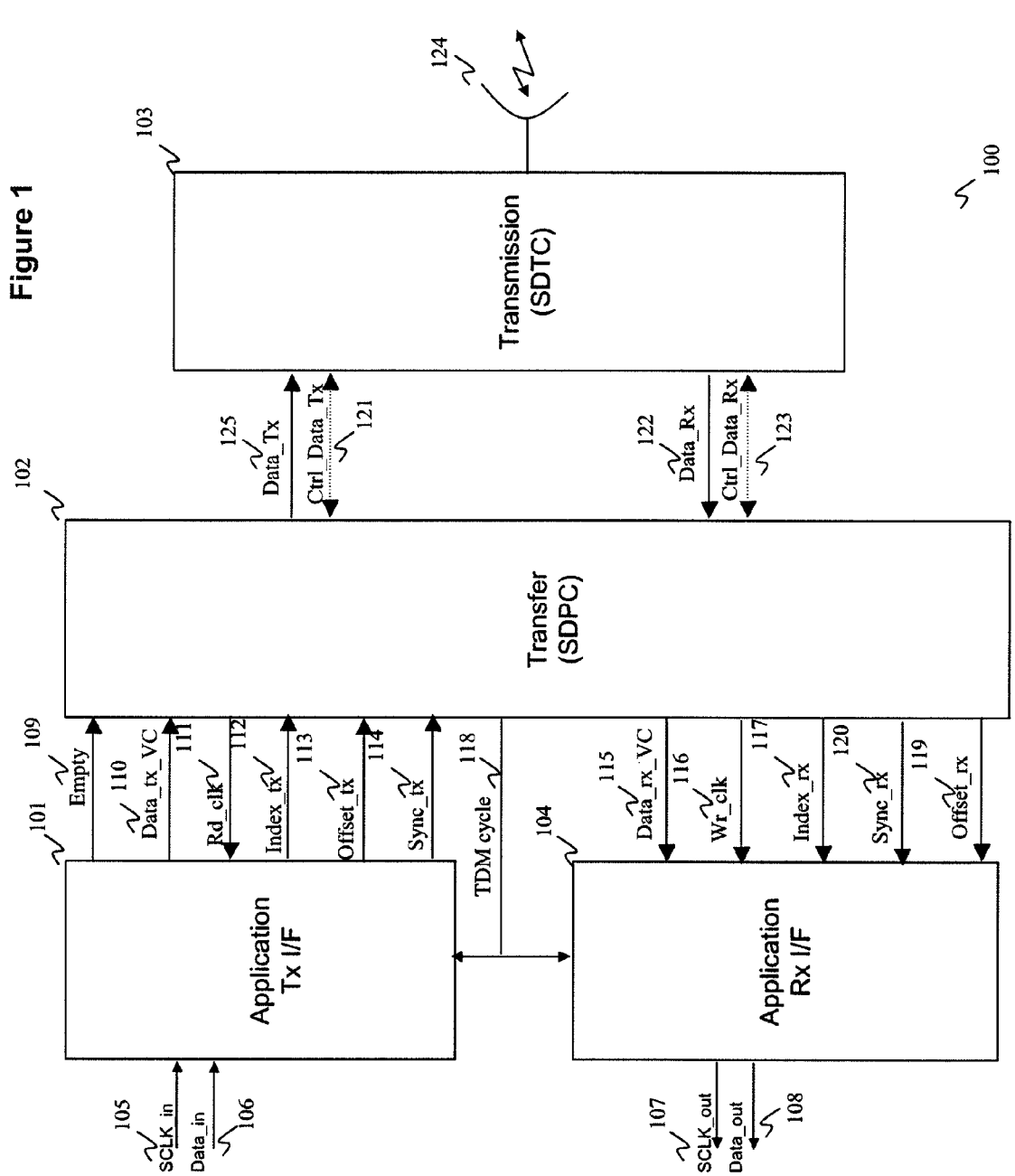

| | | | |
|---|---|---|---|
| 7,177,307 B2 * | 2/2007 | Frouin et al. | 370/362 |
| 7,720,110 B2 * | 5/2010 | Spalink | 370/516 |
| 2002/0176486 A1 * | 11/2002 | Okubo et al. | 375/146 |
| 2003/0156555 A1 * | 8/2003 | Sunden | 370/324 |
| 2006/0286975 A1 * | 12/2006 | Sugitani et al. | 455/426.1 |
| 2007/0116062 A1 * | 5/2007 | Spalink | 370/503 |
| 2008/0040759 A1 * | 2/2008 | She et al. | 725/81 |
| 2009/0092151 A1 | 4/2009 | Raguet et al. | 370/468 |

FOREIGN PATENT DOCUMENTS

EP  1052793 A1 * 11/2000

OTHER PUBLICATIONS

U.S. Appl. No. 12/351,248, filed Jan. 9, 2009, Inventors, Arnaud Closset, et al.

\* cited by examiner

METHODS FOR SYNCHRONIZING APPLICATIVE CLOCK SIGNALS IN A SYNCHRONOUS COMMUNICATIONS NETWORK, CORRESPONDING EMITTER AND RECEIVER DEVICES, COMPUTER-READABLE STORAGE MEANS

FIELD OF THE INVENTION

The field of the invention is that of communication systems. More specifically, the invention relates to a technique of synchronization of applicative clock signals between a transmission device and at least one reception device connected to a synchronous communications network.

A communication system consisting of terminals (also called devices or nodes) connected to a communications network is characterized:

firstly, through the synchronous or asynchronous nature of the transmission mode used on the transmission channel and the mode of transfer of information above the transmission mode, and secondly through the synchronous or asynchronous nature of the applications borne within the terminals.

Among the transmission modes implemented in networks, we can identify synchronous transmission modes (for example the ADSL or "Asymmetric Digital Subscriber Line") used in networks known as circuit-switching networks and asynchronous transmission modes (for example Ethernet) used in networks known as packet-switching networks.

Among the transfer modes implemented in networks, we may cite TDM (Time Division Multiplexing) type synchronous transfer modes and asynchronous transfer modes using asynchronous data segmentation and reassembly techniques above the transmission channel (as used for example in the ATM Asynchronous Transfer Mode protocol).

The classic and preferred way of supporting the implementation of synchronous applications (such as audio or video type applications) is to rely on a synchronous type network, at the level of both the transmission mode and the transfer mode. Indeed, the quality of service required for this type of application dictates a high level of temporal maintenance, at the level of the total system, between events created at the source and events regenerated at destination (in terms of tolerance with regard to transfer time between applications through the network, jitter at the time of delivery of applicative data, jitter at the time of delivery of data to two destination applications, for example).

The setting up of synchronous applications in a multi-point scenario, implementing a synchronous data exchange between a source application and several destinations applications simultaneously (for example a Home Cinema type audio distribution application) dictates a quality of service due to human perception which entails very heavy constraints, firstly with regard to jitter at the instants of regeneration by the receiver applications of audio data for each audio stream (known as intra-stream jitter) and secondly at the instants of regeneration of data between audio streams (known as inter-stream jitter).

In the case of an architecture where the transmit and receive applications use one and the same nominal reference frequency, there is by definition a variation between the two real frequencies due to tolerance as regards to the nominal frequency, generally expressed in ppm (parts per million) given by the electronic components. It is therefore necessary to use a technique to maintain synchronization between transmit and receive applications for this type of architecture, which strives to synchronize the clock of the consumer application with the clock of the sender application.

Furthermore, in the implementation of a TDM type synchronous transfer mode, a time reference of fixed duration is defined. This time reference is called a network cycle or again a TDM cycle and distributed to all the nodes of the network. Another term used is "network clock" or again TDM clock corresponding to the network cycle. This network cycle is divided into a whole number of synchronous virtual channels (or VCs) designed to support the transmission of all the traffic between the nodes of the network. Each virtual channel is transmitted systematically at each network cycle and therefore represents a constant portion of the bandwidth of the transmission channel characterized by the fixed duration of the network cycle and by the fixed quantity of information contained in each virtual channel. The setting up of synchronous source and destination applications on this transfer mode then consists of the allocation to the source application (supported by a transmission node) of a constant whole number of virtual write channels as a function of the required applicative bandwidth, these same virtual channels being write-allocated for the destination application or applications (carried by reception nodes).

Now, for most synchronous applications, the source applicative clock is independent of the network clock. Similarly, the format of the applicative data is generally independent of the format of the virtual channel data. In a network cycle, a virtual channel which cannot be entirely filled by applicative data will be formatted with a header indicating an absence of applicative data. A virtual channel entirely filled with applicative data will be formatted with a header indicating the presence of applicative data. Indeed, given the independence of the format between applicative data and virtual channel, the use of a complex virtual channel header to report the variable organization of the number of pieces of applicative data within a virtual channel would significantly reduce the useful bandwidth relative to the total bandwidth of the system. As a consequence, a piece of applicative data made available by the source application during a network cycle will not necessarily be transmitted via the network, in a virtual channel, during the next network cycle but could occasionally undergo a delay of one network cycle. The time taken to convey a piece of data between the instant of writing of this data (to a buffer memory included in the transmit node) by the source applicative clock and the instance of which this data is made available to the destination application is therefore variable in time within the network cycles.

TECHNOLOGICAL BACKGROUND

There are several known techniques in the prior art use to maintain synchronization between applications in an architecture in which sender and receiver applications use one and the same nominal reference frequency. Most of these known techniques focus on synchronizing the receiver (consumer) application clock with the sender application clock.

In a first prior-art synchronization technique (described in "Understanding Jitter and Wander Measurements and Standards", Agilent Technologies, 5988-6254EN, 2003, especially FIG. 12.5), the clocks continue to be used independently and there is no automatic control of frequency for the clocks. This first technique relies on the use of a method for the regulation of the throughput rate in the receiver node (called a slip buffer). It consists if the insertion or elimination of a piece of applicative data depending on the divergence in rhythm observed between the throughput rate of data coming from the network and the read rate by the receiver application.

One drawback of this first technique is that it does not provide for the integrity of the data except when the precision in the nominal value of the clock frequencies is 0 ppm. If not, it is up to the receiver application to set up means to mask the defects of integrity of the data, A second prior-art synchronization technique (described in the U.S. Pat. No. 6,791,987), called adaptive memory or adaptive buffer consists in setting up an automatic control between the read frequency in the receive node as a function of the level of filling of a memory containing the applicative data coming from the communications network. This second known technique is used to accelerate the reading rate when the quantity of data in the reception memory goes beyond a predetermined threshold or to slow down the reading rate when the quantity of data in the reception memory falls below a predetermined threshold. However, one drawback of this second technique is that it necessitates the addition of developed smoothing methods in order to achieve the integration in time of measurements observed at specific times and thus prevent a jitter effect of the regenerated applicative frequency. Because of the compromise between the maximum time taken for the correction of a drift and the frequency precision with respect to the correction made, this type of method is ill suited to the quality of service requirements imposed on and expected from multipoint synchronous applications.

A third prior-art synchronization technique (described in the U.S. Pat. No. 6,327,273) makes direct use of the network cycle to generate the source and destination applicative clocks. In this case, each source and destination terminal multiplies its network cycle by a same value in order to generate its applicative clock. This third technique necessitates a mode of distribution of the network clock which sets up an automatic control between the network cycles at each terminal. One drawback of this third technique is that it cannot be used to support applicative clocks whose frequencies are independent (i.e. not a multiple or sub-multiple) of the clock frequency of the reference network.

A fourth prior art synchronization technique (described in the patent application EP1052793A1) relies on the periodic dispatch by the source application of temporal information pertaining to time offsets between the events of the source applicative clock and events of the network clock. These pieces of temporal information or synchronous residual time stamps are intended for the computation at the sink node of a drift between source applicative clocks and destination applicative clocks through the network cycle and for setting up an automatic control accordingly between the destination applicative clock frequency and the source applicative frequency, depending on the content of the temporal information received. This fourth prior art technique dictates the setting up in the communications network of a service to ensure constant transfer time of this information, between the instant at which a piece of data is written by the source applicative clock and instant at which this piece of data is made available to the automatic control function of the destination applicative clock in the sink node. With regard to this constraint, this fourth technique can actually be used only in synchronous networks in which the nominal source clock of the application and the network reference clock have a relationship of proportionality between respective nominal values.

GOALS OF THE INVENTION

The invention in at least one embodiment is aimed especially of overcoming these different drawbacks of the prior art.

More specifically, it is a goal of at least of one embodiment of the invention to provide a technique for the synchronizing of applications connected to a network using a TDM type synchronous transfer mode (with a network clock), the source and destination applicative clocks being independent of the network clock. In other words, it is a goal of the invention to provide a technique of synchronization of applicative clocks between a transmission device and at least one reception device connected to a synchronous communications network.

At least one embodiment the invention is also aimed providing a technique of this kind that does not necessitate the setting up, in the communications network, of a service ensuring a constant data transfer time between the instant at which a piece of data is written by the source applicative clock and the instant of which this piece of data is made available to the automatic control function of the destination applicative clock in the sink node.

It is an additional goal of at least one embodiment of the invention to provide a technique of this kind enabling synchronization on the fly of a new destination application in a multipoint applicative scenario.

SUMMARY OF THE INVENTION

One particular embodiment of the present invention proposes a method for transmitting information enabling a synchronization of applicative clocks signals between an emitter device and at least one receiver device connected to a communications network, said emitter device performing the following steps:

receiving pieces of applicative data from a source application, at a data rate defined by a source applicative clock, and transmitting said pieces of applicative data via said network, at a data rate defined by a network clock, the network clock being independent of the source applicative clock, said method being such that said emitter device performs the following steps upon detection of a clock adjustment event:

determining a piece of time offset information between a reference instant of a current network cycle and an instant relative to the reception of a reference one of said pieces of applicative data;

determining a piece of information on a position, of said reference piece of data, among the pieces of applicative data to be transmitted via said network during a determined network cycle;

transmitting, via said network, said information on time offset and position during said determined network cycle.

Another particular embodiment of the invention proposes a method for transmitting information for a synchronization of applicative clocks signals between an emitter device and at least one receiver device connected to a communications network implementing a time division multiplexing type of synchronous transfer mode with a network clock that defines a network cycle, said emitter device performing the following steps for each stream of a source application with at least one stream:

writing to a buffer memory associated with said stream, at the rate of a source applicative clock, of pieces of applicative data of said stream coming from said source application, and transmitting, via said network, the pieces of applicative data of said stream at the rate of the network clock, said method being such that for at least one stream of said source application, said emitter device performs the following steps upon detection of a clock adjustment event:

determining a piece of time offset information between a starting instant of a current network cycle and an instant of writing one of the pieces of applicative data of said stream, called a reference piece of data, to the buffer memory associated with said stream;

determining a piece of information on position of said reference piece of data from among the pieces of applicative data of said stream to be transmitted via said network during a determined network cycle;

transmitting via the communications network of said information on time offset and position during said determined network cycle.

Thus, the synchronization technique of the invention relies on an wholly novel and inventive approach in which it is not only a piece of time offset information that is transmitted (as in the above-mentioned fourth known technique) but also a piece of information on position of the data (called reference data) that has been used to compute the time offset information, and more generally a piece of information of the data (called reference data) that has been used to compute the time offset information.

Thus (and as shall be shown in greater detail here below), the combined use of these two pieces of information makes it possible, in the reception device, to apply the time offset to the data used for its computation and thus enables the synchronizing in phase and frequency of remote applications (source and destination applications) whose data format and clocks are independent of the properties of the mode of transfer via the network (for example the format of the virtual channels and the network reference cycle). The above-mentioned fourth prior-art technique enables frequency synchronization but not phase synchronization, since no information about the reference piece of data is transmitted.

The combined use of these two pieces of information also makes it possible, in each reception device, to carry out an on-the-fly synchronization of destination (or consumer) applications in the case of multipoint applicative systems. In this case, the data will be given to a consumer application only on the basis of the reference data received from the communications network in order to start the data transfer to the destination (or consumer) application with a consumer applicative clock locked in frequency and in phase with the source applicative clock.

Advantageously, the determined network cycle is the network cycle following the current network cycle.

Thus, the transmission latency in the communications network is reduced.

Advantageously, said method comprises a step of checking that said reference piece of data will effectively be transmitted via the communications network during said determined network cycle and said step of transmission of said pieces of information on time offset and position is performed only if said reference piece of data is to be transmitted during the determined network cycle.

Thus, it is possible to avoid conveying additional information representing the packetization jitter.

According to an advantageous characteristic, said method comprises a step of comparison of said time offset information with a predetermined confidence interval, and said steps of determining a piece of information on position and of transmitting said pieces of information on time offset and position are performed only if said time offset information is included in said predetermined confidence interval.

Thus, it is possible to allow an operational range of application of the time offset information in the receiver device as a function of the constraints of implementation related to the computation time required for the time offset information and by ensuring that the time offset will be smaller than the potential jitter of the network.

Advantageously, each network cycle comprises an integer number of synchronous virtual channels. Said pieces of applicative data are transmitted in one or more of virtual data channels, allocated to the transmission of said applicative data. Said pieces of information on time offset and position are transmitted in at least one virtual control channel, distinct from said virtual data channels.

Thus, the number and the position of the virtual channels used to convey the information on time offset and position information are independent of the number of channels allocated to the transmission of applicative data, thus regardless of the data applicative rate.

According to one variant, each network cycle comprises an integer number of synchronous virtual channels, each virtual channel comprising a header and a payload part. The pieces of applicative data are transmitted in the payload part of one or more of said virtual channels. Said pieces of information on time offset and position are transmitted in the header of a virtual data and synchronization channel, the payload part of which contains said reference piece of data. If the payload part of said virtual data and synchronization channel contains only said reference piece of data, then said information on position is not transmitted in the header of said virtual data and synchronization channel.

According to an advantageous characteristic, said method comprises a step of periodically generating said clock adjustment event, according to a predetermined period that is a function of requirements on the jitter and maximum frequency drift authorized by said source application generating said application data.

Thus, the transmission of the information needed to ensure the synchronization of the emitter device and of the receiver device requires a small amount of bandwidth, in preventing transmission of this kind at each network cycle while at the same time ensuring compliance with application constraints.

Advantageously, said source application generates at least two streams and generates applicative data at the same rate for each one of the streams. The steps of said method are performed only for one of said source application streams, said pieces of information on time offset and position being associated with a piece of data for each of the streams.

Thus, in using pieces of information on time offset and position common to all the streams of a multi-stream application (as known as multi-channel application), the method requires no additional method of synchronization between receiver devices to comply with inter-stream synchronization (for example the spatial character of the rendering of a home cinema type sound amplifier system), and this is achieved independently of the location of the receiver devices in the synchronous network.

Thus, it is enough to compute the pieces of information on time offset and position for a single stream since:

the source application generates applicative data at the same rate for each of the streams;

the source application provides simultaneously the piece of applicative data of said streams;

the emitter device transmits the pieces of applicative data of the different streams simultaneously on said network, at the rate of the network clock.

One of the receiver devices to which the first stream is intended applies the time offset to a reference piece of data of said first stream, which has been used to compute this time offset. Each other receiver device to which another stream is intended applies the time offset to a piece of data of this other stream generated (or provided) by the source application at the same time as the reference data for the first stream.

In another embodiment, the invention proposes a method for receiving information enabling a synchronization of applicative clocks between an emitter device and at least one receiver device connected to a synchronous communications network, said receiver device performing the following steps:
  receiving pieces of applicative data via said network at a rate defined by a network clock, and
  providing said pieces of applicative data to a consumer application, at a rate defined by a consumer applicative clock, the consumer applicative clock being independent of the network clock,
said method being such that the receiver device performs at least one iteration of the following steps:
  receiving, from the communications network, pieces of information on time offset and position associated with pieces of applicative data received during a network cycle;
  as a function of said information on position, selecting (507, 508) a reference piece of data from among the pieces of applicative data received from the communications network;
  determining an instant of providing said reference piece of data to said consumer application, starting from a starting instant of an offset applying network cycle (the network cycle during which the offset is applied) to which is added an offset defined by said piece of information on time offset;
  providing said reference piece of data at the determined instant, then providing the pieces of applicative data that follow said reference piece of data at the rate of said consumer applicative clock.

Another embodiment of the invention relates to a method for receiving information enabling a synchronization of applicative clocks between an emitter device and at least one receiver device connected to a synchronous communications network, said communications network implementing a time division multiplexing type of synchronous transfer mode, with a network clock that defines a network cycle, said receiver device performing the following steps:
  writing, to a buffer memory, pieces of applicative data received via said network at the rate of the network clock, and
  reading, at the rate of a consumer applicative clock, pieces of applicative data stored in said memory, the data read being intended for a consumer application,
said method being such that the receiver device performs at least one iteration of the following steps:
  receiving, from the communications network, pieces of information on time offset and position associated with pieces of applicative data received during a network cycle;
  as a function of said information on position, selecting a reference piece of data from among the pieces of applicative data written to the memory;
  determining an instant of reading said reference piece of data in said memory, starting from a starting instant of an offset applying network cycle (the network cycle during which the offset is applied) and adding an offset defined by said piece of temporal offset information;
  reading said reference piece of data at said reading instant, then reading the data that follows said reference piece of data at the rate of said consumer applicative clock.

Advantageously, said piece of information on position is a piece of information on the position of said reference piece of data among the pieces of applicative data received from the communications network during the network cycle preceding said offset applying network cycle.

Advantageously, the method comprises a step for invalidating the reading of applicative before said reference piece of data if a first iteration of the steps of said method has not already been performed or if a loss of synchronization has occurred since an already performed first iteration.

This enables a synchronization of a destination (or consumer) application hosted by a receiver device, either in the event of a loss of synchronization or in the event of on-the-fly synchronization of a new destination (or consumer) application (such as a first connection of the receiver device that hosts it) in a multi-point applicative scenario.

In another embodiment, the invention relates to a computer program product downloadable from a communications network and/or recorded on a computer-readable carrier and/or executable by a processor, said computer program product comprising program code instructions for the implementation of the method according to at least one of the abovementioned embodiments when said program is executed on a computer.

In another embodiment, the invention relates to a computer-readable storage means, possibly wholly or partially detachable, storing a set of instructions executable by said computer to implement the method according to at least one of the above-mentioned embodiments.

Another embodiment of the invention proposes an emitter device transmitting information enabling a synchronization of applicative clocks signals between said emitter device and at least one receiver device connected to a communications network, said emitter device comprising:
  receiving means for receiving pieces of applicative data from a source application, at a data rate defined by a source applicative clock, and
  first transmitting means for transmitting via said network the pieces of applicative data at a rate defined by a network clock, the network clock being independent of the source applicative clock,
said emitter device being such that it comprises the following means, activated upon detection of a clock adjustment event:
  means for determining a piece of time offset information between a reference instant of a current network cycle and an instant relative to the reception of a reference one of said pieces of applicative data;
  means for determining a piece of information on a position of said reference piece of data from among the pieces of applicative data to be transmitted via said network during a determined network cycle;
  second transmitting means for transmitting via the communications network said information on time offset and position during said determined network cycle.

A particular embodiment of the invention proposes an emitter device transmitting information enabling a synchronization of applicative clocks signals between said emitter device and at least one receiver device connected to a communications network implementing a time division multiplexing type of synchronous transfer mode with a network clock that defines a network cycle, said transmission device comprising:
  writing means that can be used, for each stream of a source application with at least one stream, for the writing to a buffer memory associated with said stream, at the rate of a source applicative clock, of pieces of applicative data of said stream coming from said source application, and first transmission means enabling the transmission via said network, for each stream, of the pieces of applicative data of said stream at the rate of the network clock.

Said transmission device comprises the following means activated for at least one stream of said source application, upon detection of a clock adjustment event:

means for determining a piece of time offset information between a starting instant of a current network cycle and an instant of writing one of the pieces of applicative data of said stream, called a reference piece of data, to the buffer memory associated with said stream;

means for determining a piece of information on position of said reference piece of data from among the pieces of applicative data of said stream to be transmitted via said network during a determined network cycle;

second means for transmitting via the communications network said information on time offset and position during said determined network cycle.

Advantageously, the determined network cycle is the network cycle following the current network cycle.

Advantageously, said emitter device comprises means for checking that said reference piece of data will effectively be transmitted via the communications network during said determined network cycle and said second means for transmitting said pieces of information on time offset and position are activated only if said reference piece of data is to be transmitted during the determined network cycle.

Advantageously, said transmission device comprises means for comparing said time offset information with a predetermined confidence interval, and said means for determining a piece of information on position and means for transmitting said pieces of information on time offset and position are activated only if said comparing means detect that said time offset information is included in said predetermined confidence interval.

According to an advantageous variant, each network cycle comprises an integer number of synchronous virtual channels. Said first transmitting means transmit said pieces of applicative data of said stream in one or more virtual data channels of said virtual channels, assigned to the transmission of said applicative data. Said second transmitting means transmit said pieces of information on time offset and position in at least one virtual control channel, distinct from said virtual data channels.

According to an advantageous variant, each network cycle comprises an integer number of synchronous virtual channels, each virtual channel comprising a header and a payload part. Said first transmitting means transmit the pieces of applicative data in the payload part of one or more of said virtual channels. Said second transmitting means transmit said pieces of information on time offset and position in the header of a virtual data and synchronization channel, the payload part of which contains said reference piece of data. If the payload part of said virtual data and synchronization channel contains only said reference piece of data, then said second transmitting means do not transmit said information on position in the header of said virtual data and synchronization channel.

Advantageously, said transmission device comprises means for periodically generating said clock adjustment event, according to a predetermined period as a function of requirements on the jitter and maximum frequency drift authorized by said source application generating said applicative data.

Advantageously, said source application generates (or provides) at least two streams and generates applicative data at the same rate for each of the streams. The means of said emitter device are activated only for one of said source application streams, said pieces of information on time offset and position being associated with a piece of data for each of the streams.

In another embodiment, the invention relates to a receiver device receiving information enabling a synchronization of applicative clocks between an emitter device and at least one receiver device connected to a synchronous communications network, said receiver device comprising:

receiving means for receiving pieces of applicative data from said network at a rate defined by a network clock, and providing means for providing said pieces of applicative data to a consumer application, at a rate defined by a consumer applicative clock, the consumer applicative clock being independent of the network clock, said receiver device being such that it comprises the following means activated at least once:

receiving means for receiving from the communications network pieces of information on time offset and position associated with pieces of applicative data received during a network cycle;

selecting means for selecting, as a function of said information on position, of a reference piece of data from among the pieces of applicative data received from the communications network;

determining means for determining an instant of providing said reference piece of data, starting from a reference instant of an offset applying network cycle (the network cycle during which the offset is applied) to which is added an offset defined by said information on time offset;

providing means for providing said reference piece of data at said determined instant, and of providing the pieces of applicative data that follows said reference piece of data at the rate of said consumer applicative clock.

In another embodiment, the invention relates to a receiver device receiving information enabling a synchronization of applicative clocks between an emitter device and at least one receiver device connected to a synchronous communications network, said communications network implementing a time division multiplexing type of synchronous transfer mode, with a network clock that defines a network cycle, said reception device comprises:

writing means enabling the writing, to a buffer memory, of pieces of applicative data received on said network at the rate of the network clock, and reading means enabling the reading, at the rate of a consumer applicative clock, of pieces of applicative data stored in said memory, the data read being intended for a consumer application.

Said receiver device comprises the following means activated at least once:

receiving means for receiving, from the communications network, pieces of information on time offset and position associated with pieces of applicative data received during a network cycle;

selecting means for selecting, as a function of said information on position, of a reference piece of data from among the pieces of applicative data written to the memory;

determining means for determining of an instant of reading of said reference piece of data in said memory, starting from a starting instant of a network cycle, called an offset applying network cycle (the network cycle during which the offset is applied), in adding an offset defined by said piece of temporal offset information;

reading means for reading said reference piece of data at said reading instant, and then the applicative data that follows said reference piece of data at the rate of said consumer applicative clock.

Advantageously, said piece of information on position is a piece of information on the position of said reference piece of data among the pieces of applicative data received from the communications network during the network cycle preceding said offset applying network cycle.

Advantageously, said receiver device comprises invalidating means for invalidating the reading of applicative data received before said reference piece of data if a first activation of the means of said device has not already been performed or if a loss of synchronization has occurred since an already performed first activation.

LIST OF FIGURES

Figure 2:
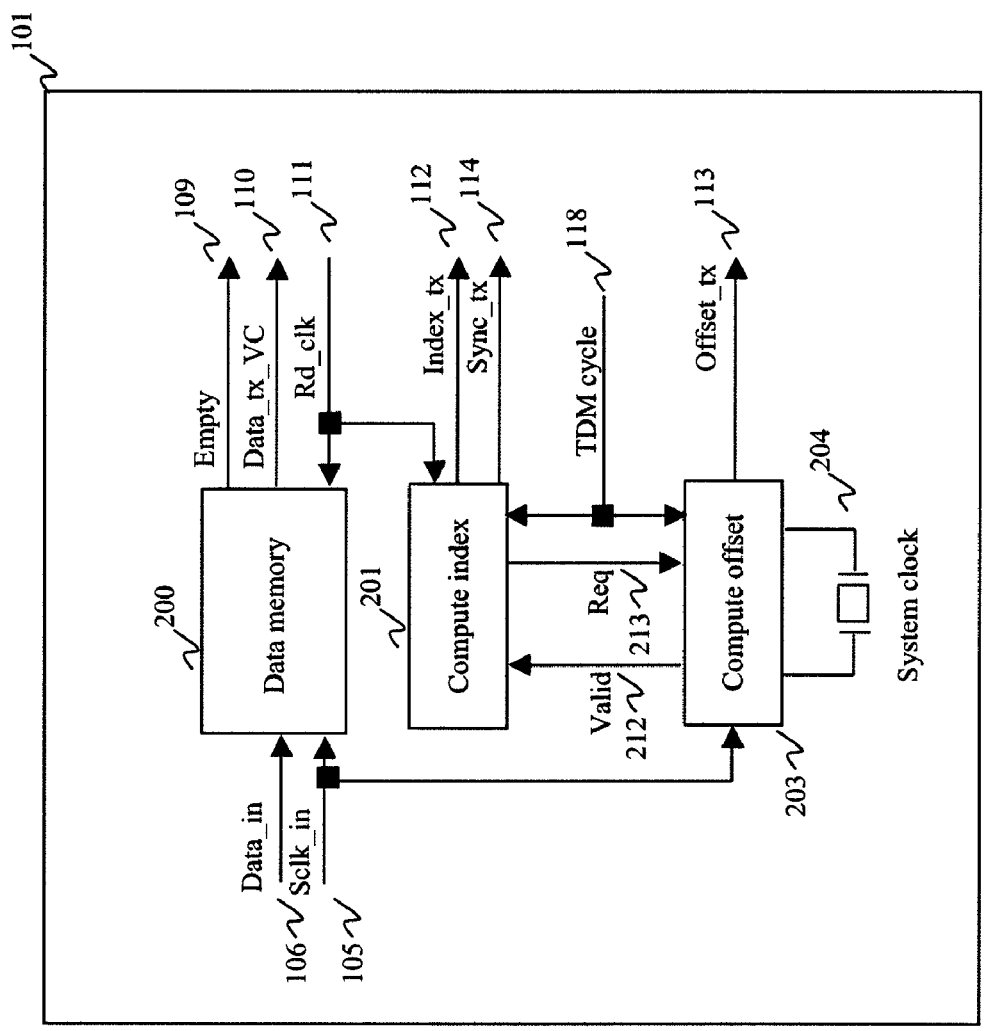
Figure 3:
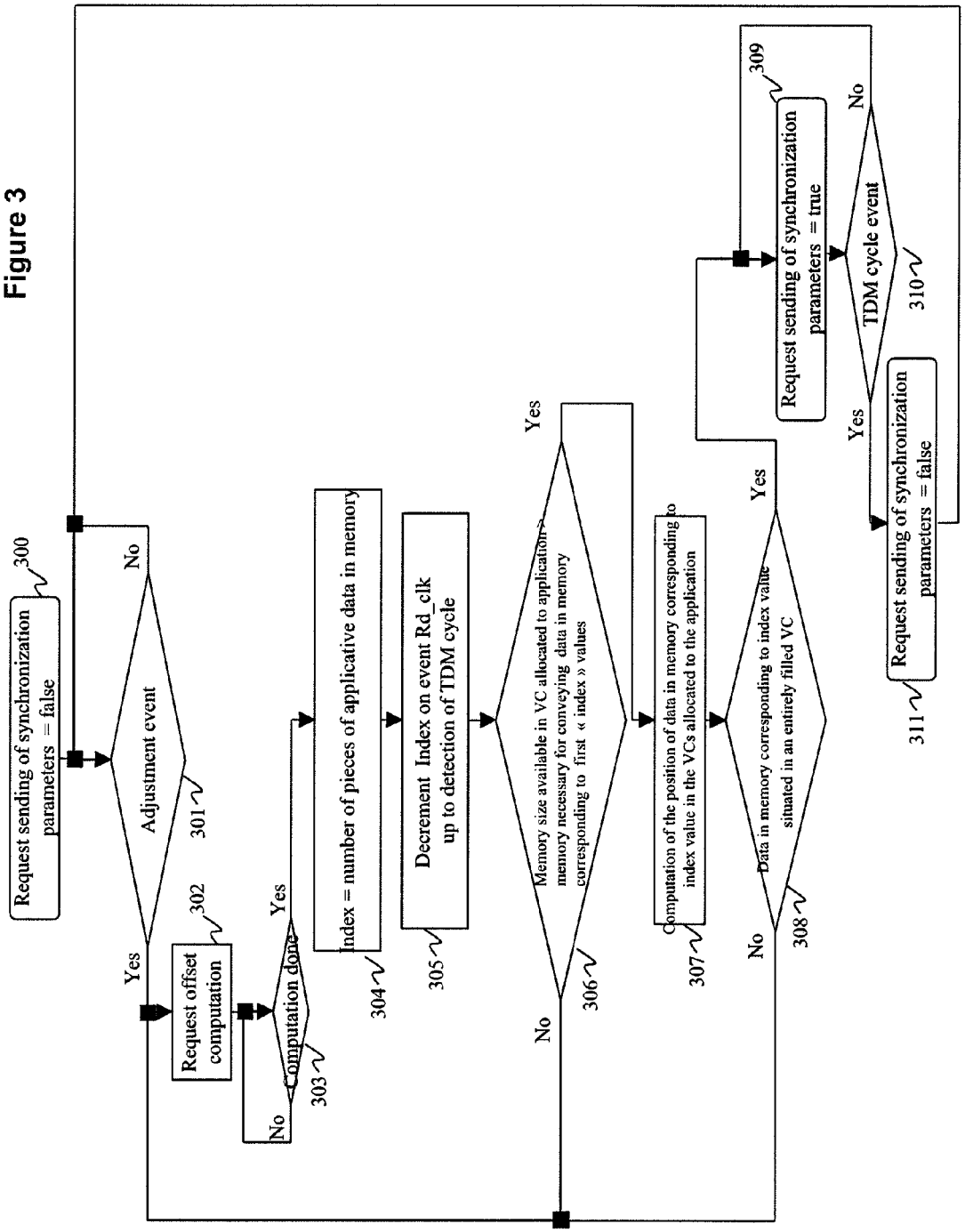
Figure 4:
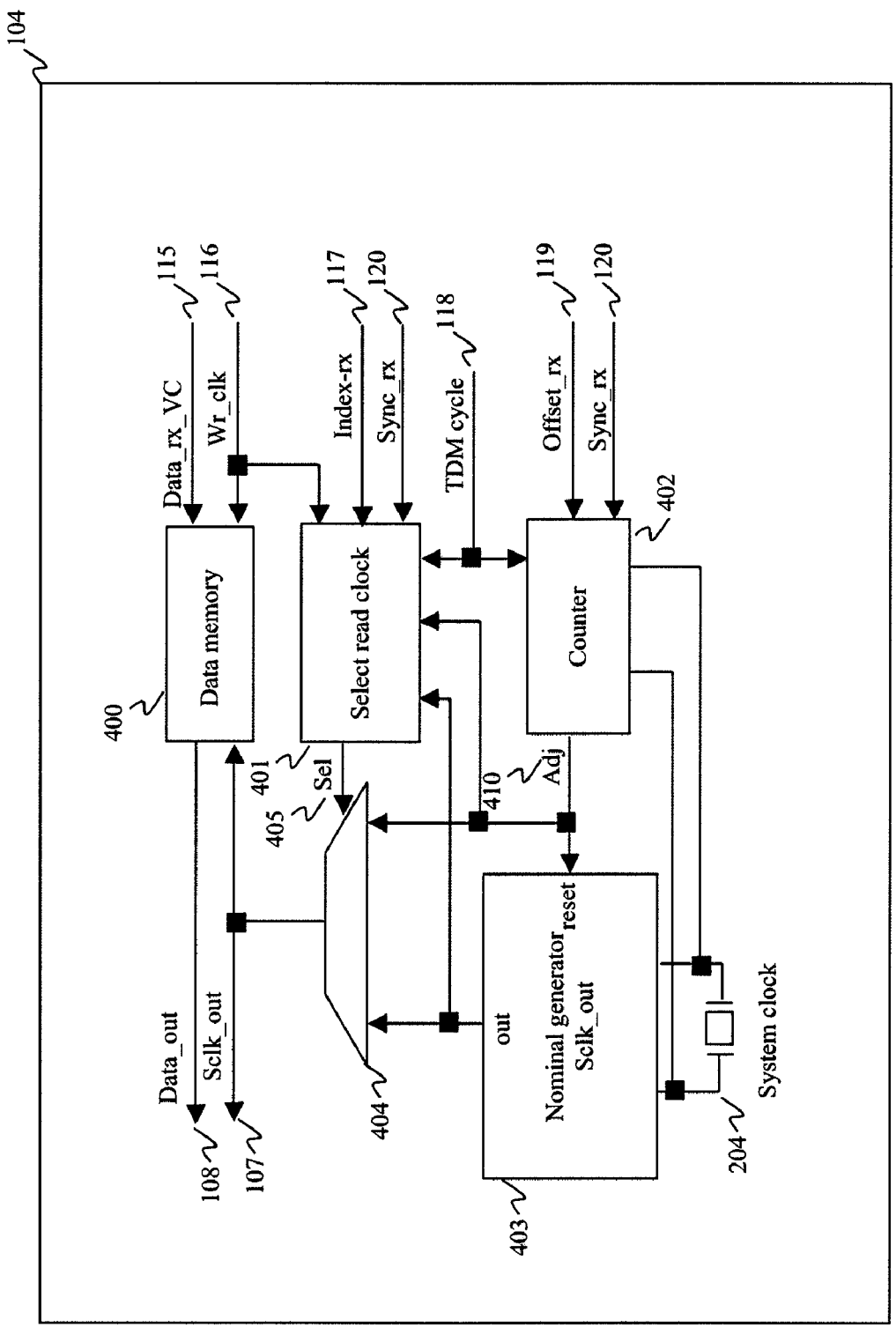
Figure 5:
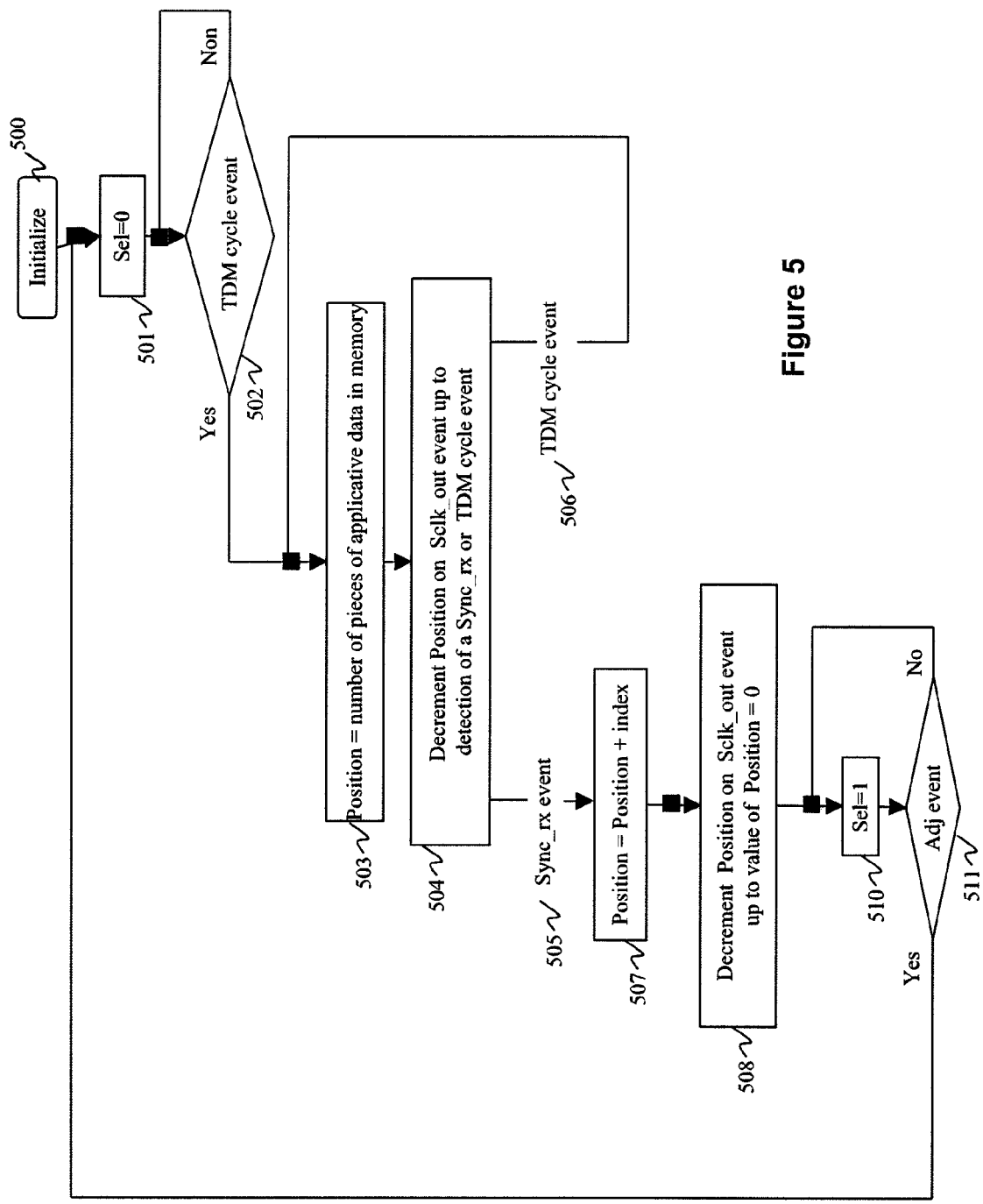

Other features and advantages of embodiments of the invention shall appear from the following description, given by way of an indicative and non-exhaustive example (not all the embodiments of the invention are limited to the characteristics and advantages of the embodiments described here below), and from the appended drawings, of which:

FIG. 1 describes the architecture of a communication node (which may be considered to be a transmission device and a reception device) of a multi-stream audio distribution system, according to a particular embodiment of the invention;

FIG. 2 describes the architecture of the transmission data-processing module connected to a source application and seen in FIG. 1, according to a particular embodiment of the invention;

FIG. 3 is a flowchart of a method for computing and transmitting synchronization information according to a particular embodiment of the invention;

FIG. 4 describes the architecture of the reception data-processing module connected to a receiver application and seen in FIG. 1, according to a particular embodiment of the invention; and FIG. 5 is a flowchart of a method for receiving and using synchronization information according to a particular embodiment of the invention.

DETAILED DESCRIPTION

In all the figures of the present document, the identical elements and steps are designated by identical numerical references.

Purely by way of illustration, an example is presented here below in the description of an application of the invention to an eight-stream audio system, working at 60 GHz and consisting of nine transmission nodes.

More particularly, the system comprises:

Eight WAR (Wireless Audio Renderer) type nodes, each of which is fitted out with an audio stream renderer integrating especially a speaker, and A WAP (Wireless Audio Player) type node, equipped with a multi-stream audio decoder or surround sound decoder capable of transmitting all the different audio streams coming from a same source through the 60 GHz communications network formed by the set of WAR and WAP nodes, The entire available bandwidth delivered by the system is sub-divided into synchronous virtual channels whose payload throughput rate is characterized by the clocking frequency of the virtual channels, for example 8 KHz, as well as by the data format of a canal, for example 48-bit. Thus, a virtual channel has a constant bit rate of 384 Kbps (kilobit per second). The full sequence comprising a representative sample of each of the available virtual channels constitutes a full synchronous data-processing cycle (SDPC) also called a network cycle, whose duration is equal to 125µ in the case of a clocking frequency of 8 KHz for the virtual channels.

An audio stream having a resolution of 44.1 KHz-24 bits will therefore use three virtual channels, by virtue of a theoretical computation of 2.756, giving for example for a full eight-channel system, conventionally called a 7.1 system, a total of 24 virtual channels, giving a necessary payload throughput rate of 9.216 Mbps (megabits per second) for the transfer of audio information. If, for the transfer of additional information in synchronous mode (control of the system, protocol, user control, etc), we add a virtual channel allocated to each transmission node of the system, a network cycle consists of 33 virtual channels, giving a payload throughput rate of 12.672 Mbps.

FIG. 1 describes the architecture of a communication node 100 of a multi-stream audio distribution system, according to a particular embodiment of the invention. This node may behave both as a transmission device and as a reception device. In the above-mentioned example, each of the WAR and WAP nodes possesses, for example, the structure of the node 100 in FIG. 1. It is of course possible to plan for another implementation in which one or more of the WAR and WAP nodes (for example the WAP node) behave solely as a transmission device and one or more of the WAR and WAP nodes (for example the WAR nodes) behave solely as a reception device.

Each communication node 100 can get connected to a source application (not shown) through a source applicative clock signal Sclk_in 105 and an applicative data signal Data_in 106 (this is the case, for example for the WAP).

A transmission data-processing module 101 (Application Tx I/F) is responsible for retrieving the data coming from the source application, storing, it (writing it) to buffer memory and making it available in playback to the SDPC transfer mode management module 102 (also called the SDPC module).

In the case of a multi-stream source application, there is one memory per stream, this memory itself being possibly a memory zone of a total memory common to several streams.

The transmission data-processing module 101 is also responsible for the computation and insertion of synchronization data pertaining to the invention.

The exchange of applicative data between the modules referenced 101 and 102 is done through interface signals Data_tx_VC 110, Rd_clk 111 and Empty 109.

The exchange of synchronization data between the modules referenced 101 and 102 is done through interface signals Index_tx 112, Offset_tx 113 and Sync_tx 114.

Each communications node 100 can also get connected to a destination application (not shown) through a consumer applicative clock signal Sclk_out 107 and an applicative data signal Data_out 108 (this is the case for example of a WAR).

A reception data-processing module 104 ("Application Rx I/F") is responsible for retrieving the data from the virtual channels coming from the SDPC transfer mode management module 102 and storing it in a buffer memory so that it can be given to the destination application at the rate of Sclk_out.

The exchange of applicative data between the modules referenced 102 and 104 is done through interface signals Data_rx_VC 115 and Wr_clk 116.

The exchange of synchronization data between the modules referenced 102 and 104 is done through interface signals Index_rx 117, Offset_rx 119 and Sync_rx 120.

The SDPC module 102 is responsible, at each network cycle (TDM cycle) 118 for retrieving the content of the source applicative data and synchronization data to format the transmission-allocated virtual channels coming from the transmission data-processing module 101 and for transferring this information to a SDTC (Synchronous Data Transmission Cycle) transmission module 103. The exchange of data between the modules referenced 102 and 103 is done through interface signals Data_tx 125 Ctrl_data_tx 121 in the direction of transmission to the network.

The SDPC module 102 is responsible for retrieving the information coming from the transmission module 103 and, at each network cycle 118, for supplying the content of the reception-allocated virtual channels intended for the reception data-processing module 104.

The exchange of data between the modules referenced 103 and 102 is done through interface signals Data_rx 122 and Ctrl_data_rx 123 in the sense of reception coming from the network.

The transmission module 103 implements a synchronous transmission mode and uses a transmit/receive antenna 124 working in the 60 GHz frequency band.

FIG. 2 describes the architecture of the transmission data-processing module 101 of FIG. 1 according to a particular embodiment of the invention. This architecture consists of:
- a buffer memory 200 connected to the source application;
- an offset computation module 203;
- an index computation module 201, and
- a system (quartz) clock 204.

The pieces of applicative data (applicative data signal Data_in 106) are stored in memory 200 at the rate of the write clock (source applicative clock signal Sclk_in 105) independently of the read operations performed by the SDPC module 102.

At each network cycle 118, the SDPC module 102 performs a predetermined number of read operations in the memory 200, computed as a function of the whole number of transmission-allocated virtual channels for said application and of the number of applicative data elements needed to fill a virtual channel. In the case of the multi-stream radio application considered, six read operations are therefore performed at each network cycle for each audio stream (i.e. for each stream of the eight-stream audio system).

When a 48-bit virtual channel cannot be filled entirely by two 24-bit audio samples, which happens occasionally for the last virtual channel allocated per audio stream, this virtual channel will be formatted with a header indicating the absence of applicative data, and the writing to the virtual channel of the audio sample already read will take place in the first virtual channel allocated to the audio stream during the next network cycle.

The virtual channels entirely filled with applicative data are formatted with a header indicating the presence of applicative data.

Following a network cycle event (start of a network cycle), when the pieces of synchronization information (Index_tx 112 and Offset_tx 113) have to be inserted into a virtual channel allocated to the exchange of protocol information, the index computation module 201 generates an event on the signal Sync_tx 114. The SDPC module 102 will insert this information into a protocol type virtual channel during the next network cycle.

FIG. 3 provides a detailed description of the application of the operations of computation and insertion of synchronization information performed by the transmission data-processing module 101.

The general principle consists in making an algorithm loop back at the rate of a predetermined adjustment period that is computed according to the requirements on the jitter and maximum frequency drift authorized by the application.

After an initialization step 300, the operation passes to a waiting step 301 and remains there until the detection of a need for generating new synchronization parameters (i.e. until detection of an adjustment event). During the step 300, the signal Sync_tx is set at zero by the index computation module 201 to inform the SDPC module 102 of the absence of synchronization information.

Following the detection of an adjustment event, the operation passes to the step 302 in which the signal Req 213 is activated for dispatch to the offset computation module 203. This corresponds to the sending of an offset computation request. Then, the operation passes to a waiting step 303 and remains there until detection of the signal Valid generated in return by the offset computation module 203. Upon reception of the active signal Req 213, the offset computation module 203 is in effect responsible for computing a time offset or difference between the start of the current network cycle (cycle N) and the next event on the source applicative clock signal Sclk_in 105. The result obtained, expressed in number of events (or ticks) of the system clock 204 whose nominal value is predetermined within each node of the network is compared with a predetermined confidence interval. The lower and upper limits of this interval are fixed in taking account of the constraints of implementation of the device (time taken for computation and insertion in transmission, computation and adjustment time in reception). Thus, when the result is beyond the fixed the confidence slot, the computation is not validated and is done between the next event the source applicative clock signal Sclk_in 105 and the start of the current network cycle (cycle N). When a result meets the confidence criteria, the signal Valid 212 is activated in return for dispatch to the index computation module 201 and the offset information is presented at the output signal Offset_tx 113.

Upon detection of the signal Valid 212, the request signal 213 is deactivated at the step 304 and the index information is set at the number of memory-resident application data 200. Then, in a step 305, the index value is decremented at the rate of the read events Rd_clk 111 of the module 102 until the detection of the next network cycle event 118 (start of the network cycle N+1).

Upon detection of the start of a network cycle N+1, the tests of the steps 306 to 308 performed in order to ascertain that the applicative data in memory 200 associated with the value of the index (at the time of the start of the network cycle N+1) will be transmitted in the network cycle N+1 that has just started. This computation comes directly from the commentary of FIG. 2 relating to the independence of format between applicative data and virtual channel and, in the case of the audio application described, will occur occasionally for an audio sample that has to be written to the third virtual channel.

More specifically, in the step 306, a check is made to see whether the memory size available in the virtual channels allocated to the application is greater then the memory size needed to convey the x (where x="index") first pieces of data in memory. If the answer is affirmative at the step 306, the operation passes to the step 307 in which the position of the indexth (or $x^{th}$) piece of data in memory in the virtual channels allocated to the application is computed. Then, at the step

308, a check is made to see whether the indexth (or x$^{th}$) piece of data in memory is situated in an entirely filled virtual channel. If the answer is affirmative then, at the step 308, the operation passes to the step 309.

If the answer is negative then, at the step 306 or at the step 308 (i.e. should the computations show that the applicative data concerned is not transmitted in the network cycle N+1), the signal Sync_tx is kept inactive so as to inhibit the request for transferring synchronization information in the network cycle N+1 and there is a returned to the step 302 in order to reiterate the computation process (computation offer time difference or offset between the start of the network cycle N and the next event on the source applicative clock signal Sclk_in 105).

At the step 309 (performed if the applicative data concerned is transmitted in the network cycle N+1), the signal Sync_tx is activated and the value of the index is copied to the output signal Index_tx 112 in order to insert the request to transfer synchronization information (Offset_tx and Index_tx) to the network cycle N+1.

Then, upon detection of the end of the network cycle N+1 (step 310), the request for transfer of the synchronization information is raised in the step 311 before returning to the waiting step 301 (pending a forthcoming adjustment event activating a new computation of synchronization information).

It must be noted that, for the sake of simplicity, the following description of FIGS. 2 and 3 presents the computation and the insertion of synchronization information performed for one stream of the source application. This stream is either the single stream of the source application (the case of a single-stream source application) or one of the streams of the source application (the case of a multi-stream source application).

As shown here above, in the case of a multi-stream source application, there is one memory per stream. This memory itself may be a memory zone of an overall memory common to several streams.

If the multi-stream source application generates applicative data for each of the streams at the same rate, and if the transmission device writes simultaneously (at the rate of the source application clock) to the different buffers memories associated with the different streams, then it is enough to perform the computation and insertion of the synchronization information for only one of the streams.

Thus, in the above mentioned case of an eight-stream audio system comprising a WAP type node (associated with an multi-stream source application) and eight WAR type nodes (each associated with an destination application processing one stream), if all the audio samples are sent simultaneously for all the streams, at the frequency Fs by the source application, then the filling of the virtual channels of the network cycle for each of the streams is identical if the same number of virtual channels is allocated for each of the audio streams (i.e. if the application uses balanced streams). A stream is also called an audio channel.

The synchronization information (offset and index information) for its part is computed only once for all the streams and is used in the same way at each of the destinations. In the above-mentioned case of an eight-stream audio system, one of the WAR type nodes, namely the one that process the stream used in the transmission device to compute synchronization information applies the resetting on the sample (called a reference sample) that has effectively been used to compute this synchronization information. Each of the other WAR type nodes applies the resetting on a sample sent by the source application at the same time as the reference sample (i.e. during the same period 1/Fs).

The method uses for example a single virtual channel of a control type to convey this information, each destination device being in a state of listening to this virtual control channel in order to apply the operations of adjusting the regenerated applicative clock.

FIG. 4 describes the architecture of the reception data-processing module 104 of FIG. 1, according to a particular embodiment of the invention. This architecture consists of:

A buffer memory 400 connected to the destination application;

A read clock selection module 401 (consumer applicative clock signal Sclk_out 107);

A counter 402;

A nominal read clock generator Sclk_out 403, based on a sub-multiple of the system clock 204;

A multiplexer 404; and

The system clock 204.

The pieces of applications data coming from the interface Data_rx_VC 115 are stored in the memory 400 at the rate of the write clock Wr_clk 116 independently of the read operations for reading this memory at the rate of the signal Sclk_out 107.

At each network cycle 118, the SDPC module 102 performs a variable number of write operations to the memory 400, as a function of the headers of the applications type virtual channels retrieved from the transmission channel.

In a network cycle, the synchronization information (Offset and Index information) retrieved in a protocol type virtual channel is made available to the receive data processing module 104 through interface signals Index_rx 117 and Offset_rx 119 in activating the signal Sync_rx 120.

The method for generating the applicative clock signal Sclk_out 107 consists on the whole in taking the output of the generator 403 by default and, upon detection of synchronization information, generating an event Adj 410 used as a signal Sclk_out 107 in place of the output signal of the module 403.

FIG. 5 is a flowchart of a method for receiving and of using the above-mentioned synchronized information (Offset and Index) according to one particular embodiment of the invention. This flowchart provides a detailed description of the implementation of the operations for readjusting the applicative clock Sclk_out 107 in the received data processing module 104.

According to the principle of operation of the counter 402, an event Adj 410 is generated at the end of a duration of a value equal to the information Offset_rx 119 coming from the SDPC module 102, the operation of counting this duration being initialized as of the next network cycle event (the start) that follows the detection of the active state of the signal Sync_rx 120.

After a initialization step 500, the signal Sel 405 is made inactive in a step 501. Thus, the signal Sclk_out 116 is connected to the output of the nominal frequency generator 403.

Then, the operation passes through a waiting step 502 in which the operation remains up to the detection of a network cycle event (start) 118 (also called a TDM cycle event).

Upon detection of a network cycle event (start), an internal variable Position is assigned to the number of pieces of applicative data in the buffer memory 400 in the step 503, then decremented at the rate of the read operations by the clock Sclk_out 107 in the state 504 until detection of an event Sync_rx 120 or an network cycle event (start) 118.

Upon detection (506) of an network cycle event (start) 118, there is a return to the step 503 so as to reiterate the initialization of the variable Position at the number of pieces of applicative data in the memory 400.

Upon detection (505) of the event Sync_rx, the variable position is reinitialized at the sum of the preceding value plus the value of Index_rx 117 present at output of SDPC module 102 (step 507) then decremented at the rate of the read operations by the clock Sclk_out 107 until the reading of the piece of applicative data that precedes the piece of data that has to be resynchronized (reference data), i.e. until the variable Position reaches a zero value (step 508).

At this point in time, in the step 510, the selection signal Sel 405 is set at 1 to link the signal Sclk_out 107 to the output Adj 410 of the counter 402. This is done until detection of the event Adj 410 (in the step 511).

The event Adj 410 thus prompts the synchronization of the reading of the next piece of applicative data in the memory 400 with the information Offset_rx 119 relative to the temporal position of the start of the current network cycle. Then a loop is made to the step 501 in order to continue the generation of the signal Sclk_out 107 at the rate of its nominal frequency (output of the generator 403).

Thus, the temporal resetting of the instant reading of a particular piece of applicative data (reference data) is performed independently of the jitter in the time taken to transmit this piece of data between the source node and the destination node.

This approach, using an index parameter independent of the position of this piece of data in the data frame associated with the network cycle and independent of the instant of writing of this piece of data in the network cycle, therefore has the advantage of overcoming the effects of the temporal characteristics associated with the formatting of the transfer mode. It also accepts a variable transmission time for the transmission of the synchronization information between applications.

Advantageously, the proposed solution enables the synchronization on the fly of a received application in a multi-point scenario (either a new application or an application that is already one of the addressees but has been desynchronized and then resynchronized at the transmission mode level) since it is enough to inhibit the generation of the signal Sclk_out at output of the module 104 up to the first occurrence of the readjustment event Adj 410.

It will be noted that the invention is not limited to a purely hardware layout but can also be implemented in the form of a sequence of computer program instructions or any form combining a hardware part and software part. Should the invention be embedded partially or totally in software form, the corresponding sequence of instructions could be stored in a storage means that is detachable (for example a floppy disk, a CD-ROM or DVD-ROM) or not detachable, this storage means being partially or totally readable by a computer or a microprocessor.

The invention claimed is:

1. Method for transmitting information enabling a synchronization of applicative clocks signals between an emitter device and at least one receiver device which communicates via a communications network, said emitter device performing the following steps:
   receiving pieces of applicative data from a source application, at a data rate defined by a source applicative clock, and
   transmitting said pieces of applicative data via said network, at a data rate defined by a network clock, the network clock being independent of the source applicative clock;
   wherein said emitter device performs the following steps upon detection of a clock adjustment event:
   determining a piece of time offset information between a reference instant of a current network cycle and an instant relative to the reception of a reference piece of data among said pieces of applicative data;
   determining a piece of information on a position in memory, of said reference piece of data that has been used to determine the piece of time offset information, among the pieces of applicative data to be transmitted via said network during a determined network cycle;
   transmitting, via said network, said information on time offset and position during said determined network cycle; and
   wherein said clock adjustment event is periodically generated according to a predetermined period that is a function of requirements on a jitter and maximum frequency drift authorized by said source application generating said applicative data.

2. Method according to claim 1, wherein the determined network cycle is the network cycle following the current network cycle.

3. Method according to claim 1, further comprising a step of checking that said reference piece of data will effectively be transmitted via the network during said determined network cycle and wherein said step of transmitting said pieces of information on time offset and position is performed only if said reference piece of data is to be transmitted during the determined network cycle.

4. Method according to claim 1, further comprising a step of comparing said time offset information with a predetermined confidence interval, and wherein said steps of determining a piece of information on position and of transmitting said pieces of information on time offset and position are performed only if said time offset information is included in said predetermined confidence interval.

5. Method according to claim 1, wherein each network cycle comprises an integer number of synchronous virtual channels,
   wherein said pieces of applicative data are transmitted in one or more virtual data channels of said virtual channels, allocated to the transmission of said applicative data,
   and wherein said pieces of information on time offset and position are transmitted in at least one virtual control channel of said virtual channels, distinct from said virtual data channels.

6. Method according to claim 1, wherein each network cycle comprises an integer number of synchronous virtual channels, each virtual channel comprising a header part and a payload part,
   wherein the pieces of applicative data are transmitted in the payload part of one or more of said virtual channels,
   wherein said pieces of information on time offset and position are transmitted in the header of a virtual data and synchronization channel, the payload part of which contains said reference piece of data,
   and wherein, if the payload part of said virtual data and synchronization channel contains only said reference piece of data, then said information on position is not transmitted in the header of said virtual data and synchronization channel.

7. Method according to claim 1, wherein said source application generates at least two streams and generates applicative data at the same rate for each of the streams,
   and wherein the steps of said method are performed only for one of said source application streams, said pieces of information on time offset and position being associated with a piece of data for each of the streams.

8. Method for receiving information enabling a synchronization of applicative clocks between an emitter device and at least one receiver device which communicates via a synchronous communications network, said receiver device performing the following steps:

receiving pieces of applicative data via said network at a rate defined by a network clock, and providing said pieces of applicative data to a consumer application, at a rate defined by a consumer applicative clock, the consumer applicative clock being independent of the network clock, wherein the receiver device performs at least one iteration of the following steps:

receiving, from the communications network, pieces of information on time offset and position associated with pieces of applicative data received during a network cycle, wherein the information on position comprises information on a position in memory;

as a function of said information on position, selecting a reference piece of data from among the pieces of applicative data received from the communications network;

determining an instant of providing said reference piece of data to said consumer application, starting from a starting instant of an offset applying network cycle to which is added an offset defined by said piece of information on time offset;

providing said reference piece of data at the determined instant, then providing the pieces of applicative data that follow said reference piece of data at the rate of said consumer applicative clock; and wherein said pieces of information of time offset and position associated with said pieces of applicative data during the network cycle are determined by the emitter device upon detection of a clock adjustment event that is periodically generated according to a predetermined period that is a function of requirements on a jitter and maximum frequency drift authorized by a source application generating said applicative data.

9. Method according to claim 8, wherein said piece of information on position is a piece of information on the position in memory of said reference piece of data among the pieces of applicative data received from the communications network during the network cycle preceding said offset applying network cycle.

10. Method according to claim 8, further comprising a step of invalidating pieces of applicative data received before said reference piece of data if a first iteration of the steps of said method has not already been performed or if a loss of synchronization has occurred since an already performed first iteration.

11. A non-transitory computer-readable storage medium, storing a set of instructions executable by a computer in order to implement a method for transmitting information enabling a synchronization of applicative clocks signals between an emitter device and at least one receiver device which communicates via a communications network, said emitter device performing the following steps:

receiving pieces of applicative data from a source application, at a data rate defined by a source applicative clock, and transmitting said pieces of applicative data via said network, at a data rate defined by a network clock, the network clock being independent of the source applicative clock, wherein said emitter device performs the following steps upon detection of a clock adjustment event:

determining a piece of time offset information between a reference instant of a current network cycle and an instant relative to the reception of a reference piece of data among said pieces of applicative data;

determining a piece of information on a position in memory, of said reference piece of data that has been used to determine the piece of time offset information, among the pieces of applicative data to be transmitted via said network during a determined network cycle;

transmitting, via said network, said information on time offset and position during said determined network cycle; and wherein said clock adjustment event is periodically generated according to a predetermined period that is a function of requirements on a jitter and maximum frequency drift authorized by said source application generating said applicative data.

12. A non-transitory computer-readable storage medium, storing a set of instructions executable by a computer in order to implement a method for receiving information enabling a synchronization of applicative clocks between an emitter device and at least one receiver device which communicates via a synchronous communications network, said receiver device performing the following steps:

receiving pieces of applicative data via said network at a rate defined by a network clock, and providing said pieces of applicative data to a consumer application, at a rate defined by a consumer applicative clock, the consumer applicative clock being independent of the network clock, wherein the receiver device performs at least one iteration of the following steps:

receiving, from the communications network, pieces of information on time offset and position associated with pieces of applicative data received during a network cycle, wherein the information on position comprises information on a position in memory;

as a function of said information on position, selecting a reference piece of data from among the pieces of applicative data received from the communications network;

determining an instant of providing said reference piece of data to said consumer application, starting from a starting instant of an offset applying network cycle to which is added an offset defined by said piece of information on time offset;

providing said reference piece of data at the determined instant, then providing the pieces of applicative data that follow said reference piece of data at the rate of said consumer applicative clock; and wherein said pieces of information of time offset and position associated with said pieces of applicative data during the network cycle are determined by the emitter device upon detection of a clock adjustment event that is periodically generated according to a predetermined period that is a function of requirements on a jitter and maximum frequency drift authorized by a source application generating said applicative data.

13. Emitter device transmitting information enabling a synchronization of applicative clocks signals between said emitter device and at least one receiver device which communicates via a communications network, said emitter device comprising:

receiving means for receiving pieces of applicative data from a source application, at a data rate defined by a source applicative clock, and first transmitting means for transmitting via said network the pieces of applicative data at a rate defined by a network clock, the network clock being independent of the source applicative clock, wherein said emitter device further comprises the following means, activated upon detection of a clock adjustment event:

means for determining a piece of time offset information between a reference instant of a current network cycle and an instant relative to the reception of a reference piece of data among said pieces of applicative data;

means for determining a piece of information on a position in memory of said reference piece of data that has been used to determine the piece of time offset information from among the pieces of applicative data to be transmitted via said network during a determined network cycle;

second transmitting means for transmitting via the communications network said information on time offset and position during said determined network cycle; and wherein said clock adjustment event is periodically generated according to a predetermined period that is a function of requirements on a jitter and maximum frequency drift authorized by said source application generating said applicative data.

14. Receiver device receiving information enabling a synchronization of applicative clocks between an emitter device and at least one receiver device which communicates via a synchronous communications network, said receiver device comprising:

receiving means for receiving pieces of applicative data from said network at a rate defined by a network clock, and providing means for providing said pieces of applicative data to a consumer application, at a rate defined by a consumer applicative clock, the consumer applicative clock being independent of the network clock, wherein said receiver device further comprises the following means activated at least once:

receiving means for receiving from the communications network pieces of information on time offset and position associated with pieces of applicative data received during a network cycle, wherein the information on position comprises information on a position in memory;

selecting means for selecting, as a function of said information on position, of a reference piece of data from among the pieces of applicative data received from the communications network;

determining means for determining an instant of providing said reference piece of data, starting from a reference instant of an offset applying network cycle to which is added an offset defined by said information on time offset;

providing means for providing said reference piece of data at said determined instant, and of providing the pieces of applicative data that follows said reference piece of data at the rate of said consumer applicative clock; and wherein said pieces of information of time offset and position associated with said pieces of applicative data during the network cycle are determined by the emitter device upon detection of a clock adjustment event that is periodically generated according to a predetermined period that is a function of requirements on a jitter and maximum frequency drift authorized by a source application generating said applicative data.

\* \* \* \* \*